US008693665B1

(12) United States Patent
Croak et al.

(10) Patent No.: US 8,693,665 B1
(45) Date of Patent: Apr. 8, 2014

(54) METHOD AND APPARATUS FOR DYNAMICALLY TERMINATING CALLS OVER DISTINCT ACCESS LINKS

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1948 days.

(21) Appl. No.: 11/238,275

(22) Filed: Sep. 28, 2005

(51) Int. Cl.
*H04M 7/00* (2006.01)
*H04L 12/66* (2006.01)

(52) U.S. Cl.
USPC . 379/219; 370/352; 379/220.01; 379/221.02; 379/221.08; 379/221.14

(58) Field of Classification Search
USPC .......... 379/219, 221.08, 221.02, 221.14, 229, 379/221.11, 220.01; 709/227; 370/352, 354
See application file for complete search history.

(56) References Cited

U.S. PATENT DOCUMENTS

| | | | | |
|---|---|---|---|---|
| 5,903,639 A * | 5/1999 | Lipchock et al. | ........ | 379/221.08 |
| 6,038,227 A * | 3/2000 | Farris et al. | .................... | 370/354 |
| 6,466,977 B1 * | 10/2002 | Sitaraman et al. | ............ | 709/225 |
| 7,953,218 B2 * | 5/2011 | Sanchez et al. | ................ | 379/219 |
| 2002/0141386 A1 * | 10/2002 | Minert et al. | ................. | 370/352 |
| 2003/0055985 A1 * | 3/2003 | Corb et al. | .................... | 709/227 |

* cited by examiner

Primary Examiner — Thjuan K Addy

(57) ABSTRACT

A method and apparatus for enabling a packet network provider, e.g., a VoIP network provider, to terminate long distance calls using both CLEC PRI access links and regulated LEC access links depending on whether or not the wholesale customer wants to treat outgoing calls in a regulated manner similar to traditional Public Switched Access Network (PSTN) calls or apply FCC information service exemptions to outgoing calls are disclosed. Based on the calling party number of a call, the network can determine if the call should be terminated as an information service call or a regulated PSTN call. Once the call termination method is determined, the appropriate access link can be chosen for call completion.

17 Claims, 4 Drawing Sheets

METHOD AND APPARATUS FOR DYNAMICALLY TERMINATING CALLS OVER DISTINCT ACCESS LINKS

The present invention relates generally to communication networks and, more particularly, to a method and apparatus for dynamically terminating calls over distinct access links in communication networks, e.g., packet networks such as Voice over Internet Protocol (VoIP) networks.

BACKGROUND OF THE INVENTION

Providers of packet network services, e.g., VoIP network services will often wholesale their network to other service providers who want to provide advanced VoIP services and features to their retail customers. Typically, there are two different methods for a VoIP network provider to treat the outgoing portion of a long distance call destined to a called party. One method is to send the call over a Primary Rate Interface (PRI) access link to a Competitive Local Exchange Carriers (CLEC) for call completion. This method is considered an information service by the Federal Communications Commission (FCC) and hence will avoid certain switched access charges levied by the Local Exchange Carrier (LEC). The other method is to process the call using standard Signaling System 7 (SS7) switched access treatment with a LEC and send the call to the LEC for call completion. However, this regulated method involves a per minute switched access charge to the long distance carrier. Some wholesale customers may prefer a long distance call to be terminated using the first method while other wholesale customers may prefer a long distance call to be terminated using the second method.

Therefore, a need exists for a method and apparatus for dynamically terminating calls over distinct access links in a packet network, e.g., a VoIP network.

SUMMARY OF THE INVENTION

In one embodiment, the present invention enables a packet network provider, e.g., a VoIP network provider to terminate long distance calls using both CLEC PRI access links and regulated LEC access links depending on whether or not the wholesale customer wants to treat outgoing calls in a regulated manner similar to traditional Public Switched Access Network (PSTN) calls or apply FCC information service exemptions to outgoing calls. Based on the calling party number of a call, the network can determine if the call should be terminated as an information service call or a regulated PSTN call. Once the call termination method is determined, the appropriate access link can be chosen for call completion.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
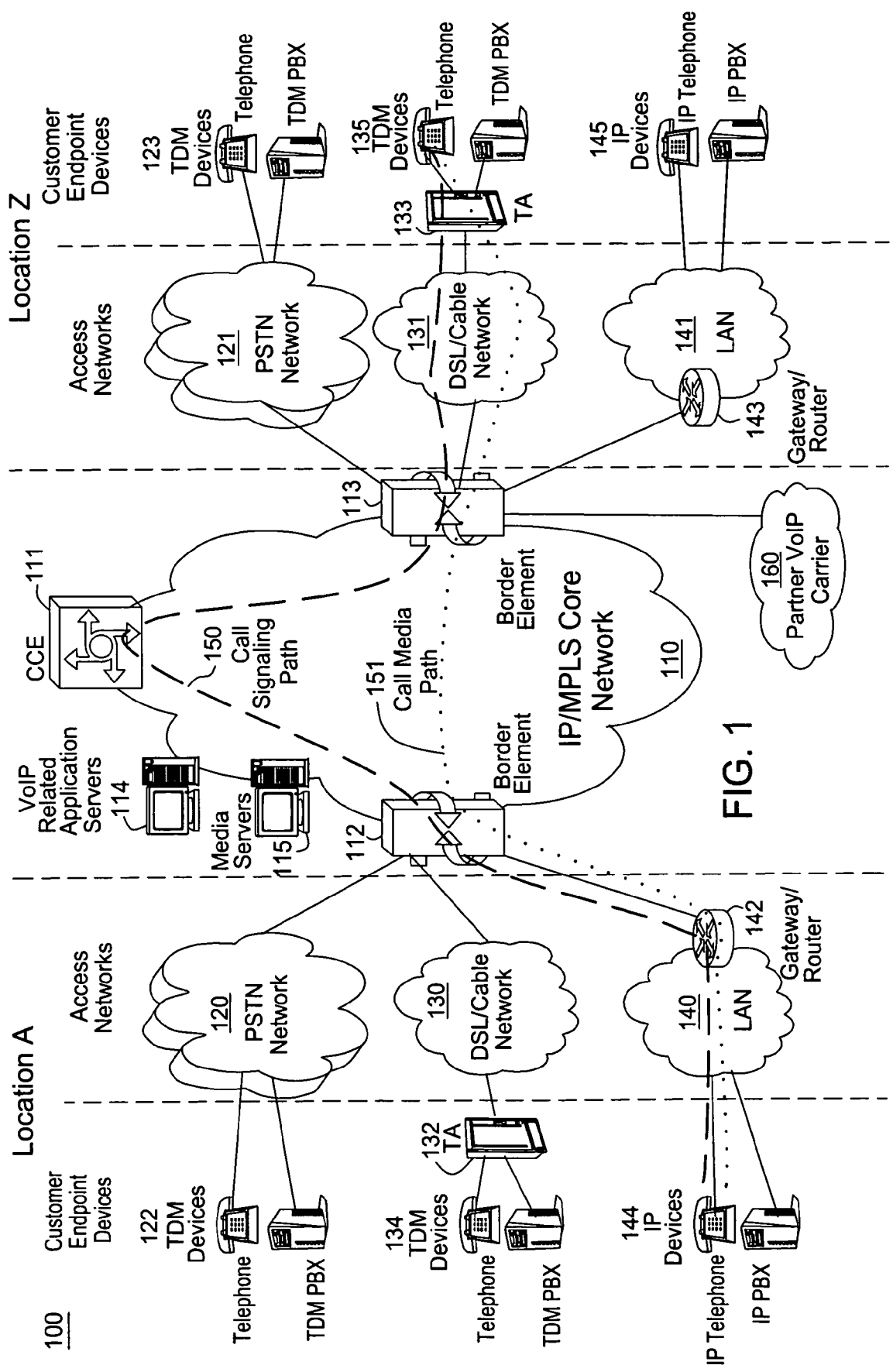
FIG. 1 illustrates an exemplary Voice over Internet Protocol (VoIP) network related to the present invention.

To better understand the present invention, FIG. 1 illustrates an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, teleconference bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Providers of packet network services, e.g., VoIP network services will often wholesale their network to other service providers who want to provide advanced VoIP services and features to their retail customers. Typically, there are two different methods for a VoIP network provider to treat the outgoing portion of a long distance call destined to a called party. One method is to send the call over a Primary Rate Interface (PRI) access link to a Competitive Local Exchange Carriers (CLEC) for call completion. This method is considered an information service by the Federal Communications Commission (FCC) and hence will avoid certain switched access charges levied by the Local Exchange Carrier (LEC). The other method is to process the call using standard Signaling System 7 (SS7) switched access treatment with a LEC and send the call to the LEC for call completion. However, this regulated method involves a per minute switched access charge to the long distance carrier. Some wholesale customers may prefer a long distance call to be terminated using the first method while other wholesale customers may prefer a long distance call to be terminated using the second method. A Primary Rate Interface (PRI) is an interface that supports 23 B channels and 1 D channel in yielding a total bit rate of 1.544 Mbps. A PRI B channel operates at 64 kbps and carries user data while a PRI D channel operates at 16 kbps and typically carries control and signaling information.

To address this need, the present invention enables a packet network provider, e.g., a VoIP network provider to terminate calls using both CLEC PRI access links and regulated LEC access links depending on whether or not the wholesale customer wants to treat outgoing calls in a regulated manner similar to traditional Public Switched Access Network (PSTN) calls or apply FCC information service exemptions to outgoing calls. Based on the calling party number of a call, the network can determine if the call should be terminated as an information service call or a regulated PSTN call. Once the call termination method is determined, the appropriate access link can be chosen for call completion.

Figure 2:
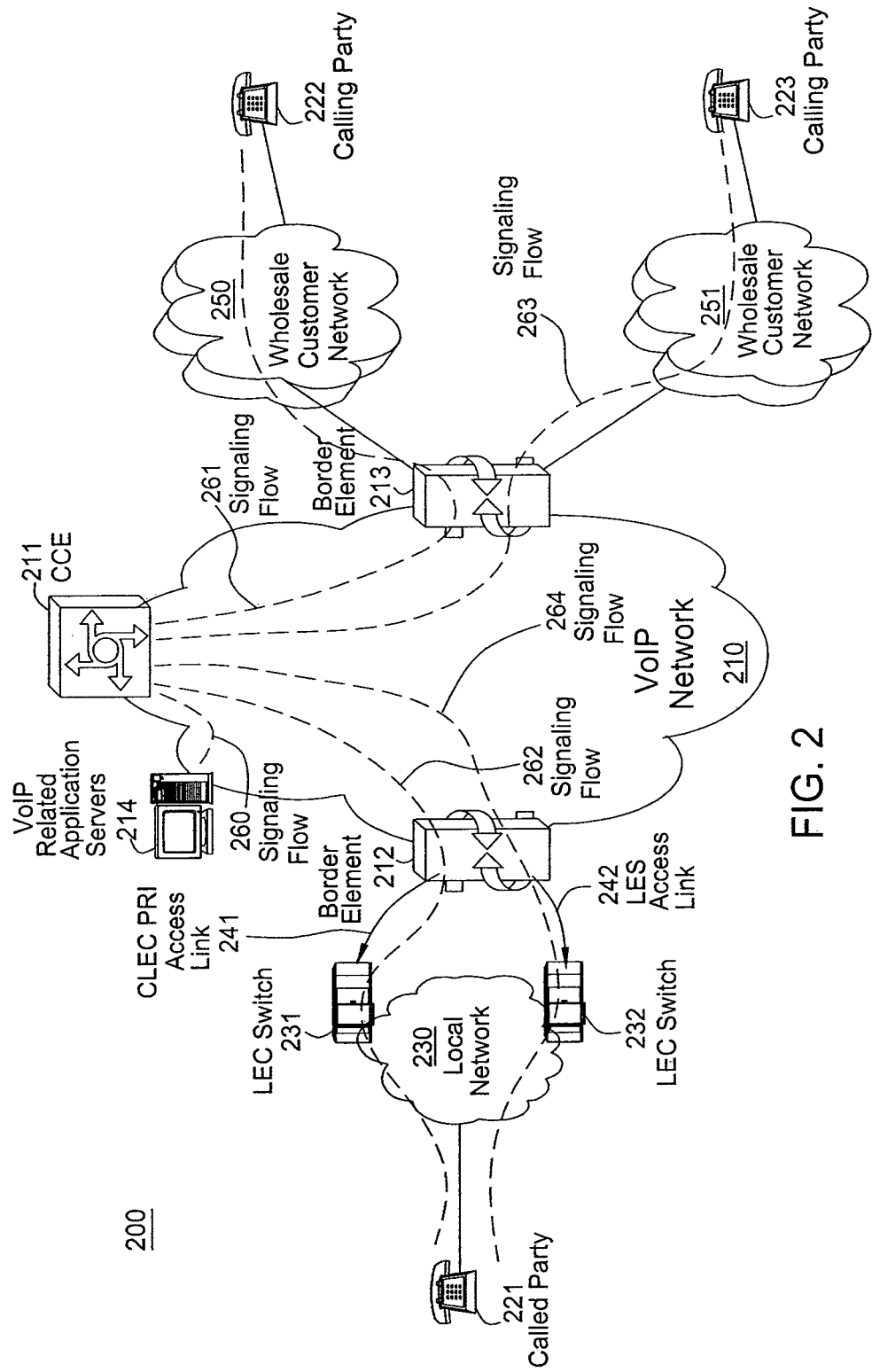
FIG. 2 illustrates an example of dynamically terminating calls over distinct access links in a VoIP network of the present invention.

FIG. 2 illustrates an exemplary communication architecture 200 for dynamically terminating calls over distinct access links in a packet network, e.g., a VoIP network of the present invention. In FIG. 2, wholesale customer network 250 operated by a wholesale customer who wishes to terminate all its outgoing calls via a CLEC PRI access link arrangement and wholesale customer network 251 operated by another wholesale customer who wishes to terminate all its outgoing calls via a regulated LEC access link arrangement. Network 210 provides wholesale services to both wholesale customer networks 250 and 251. Calling party 222 is an end user customer of wholesale network 250 and calling party 223 is an end user customer of wholesale network 251. When calling party 222 makes a call to called party 221 by sending a call setup signaling message to CCE 211 using signaling flow 261, CCE 211 communicates with AS 214 using signaling flow 260 to find out that the phone number of calling party 222 belongs to a wholesale customer who wishes to terminate all its outgoing calls via a CLEC PRI access link arrangement. Namely, the CCE will obtain the outgoing access link type for the wholesale customer from the AS. Therefore, CCE 211 forwards the call setup signaling message to BE 212 using signaling flow 262 and BE 212 forwards the call setup message to called party 221 via CLEC PRI access link 241 and CLEC switch 231 as well as local network 230. On the other hand, when calling party 223 makes a call to called party 221 by sending a call setup signaling message to CCE 211 using signaling flow 263, CCE 211 communicates with AS 214 using signaling flow 260 to finds out that the phone number of calling party 223 belongs to a wholesale customer who wishes to terminate all its outgoing calls via a regulated LEC access link arrangement. Again, the CCE obtains the outgoing access link type for the wholesale customer from the AS. Therefore, CCE 211 forwards the call setup signaling message to BE 212 using signaling flow 264 and BE 212 forwards the call setup message to called party 221 via LEC access link 242 and CLEC switch 232 as well as local network 230.

Figure 3:
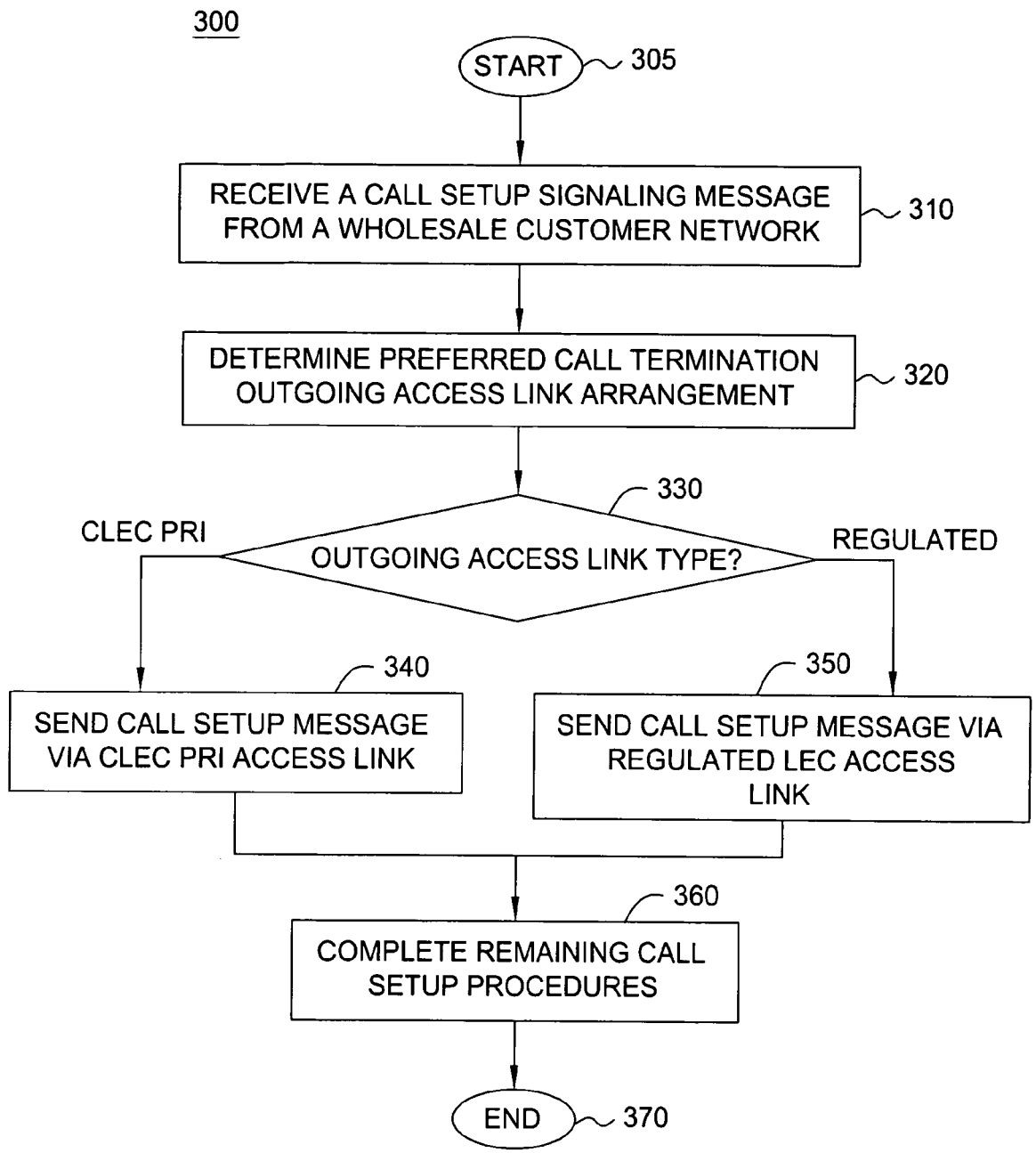
FIG. 3 illustrates a flowchart of a method for dynamically terminating calls over distinct access links in a VoIP network of the present invention.

FIG. 3 illustrates a flowchart of a method 300 for dynamically terminating calls over distinct access links in a packet network, e.g., a VoIP network of the present invention. Method 300 starts in step 305 and proceeds to step 310.

In step 310, the method receives a call setup message originated by an end user customer of a wholesale customer network.

In step 320, the method determines the preferred call termination outgoing access link arrangement specified by the wholesale customer. In one embodiment, the CCE communicates with an AS to determine the specified access link arrangement.

In step 330, the method checks the specified access link arrangement. If the preferred call termination outgoing access link arrangement is via a CLEC PRI access link, the method proceeds to step 340. If the preferred call termination outgoing access link arrangement is via a regulated LEC access link, the method proceeds to step 350.

In step 340, the method sends the call setup message towards the called party via a CLEC PRI access link.

In step 350, the method sends the call setup message toward the called party via a regulated LEC access link.

In step 360, the method completes the remaining call setup procedures to complete the call. The method ends in step 370.

Figure 4:
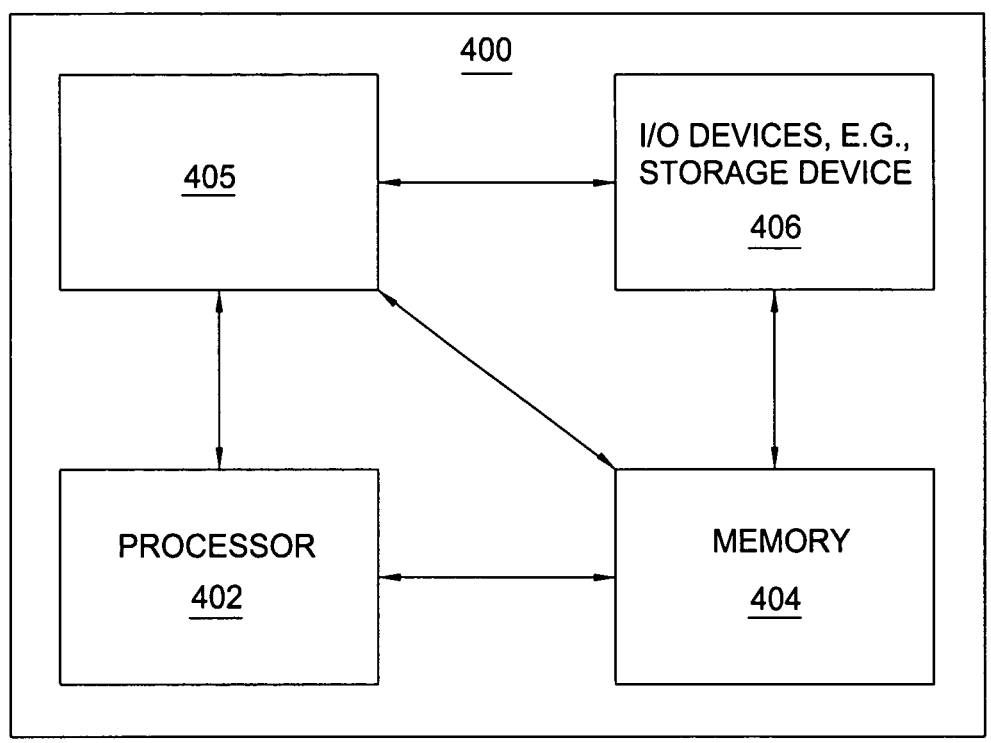
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing dynamic call termination over distinct access links, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for providing dynamic call termination over distinct access links can be loaded into memory 404 and executed by processor 402 to implement the functions as discussed above. As such, the present process 405 for providing dynamic call termination over distinct access links (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for terminating a call in a packet network, comprising:

receiving, by a processor, a call setup signaling message to setup a call from a wholesale customer at the packet network;

determining, by the processor, an outgoing access link type for the call based upon a calling party number, wherein the outgoing access link type comprises a primary rate interface access link to a competitive local exchange carrier or a regulated access link to a local exchange carrier; and selecting, by the processor, an outgoing access link in accordance with the outgoing access link type to complete the call.

2. The method of claim 1, wherein the packet network is an internet protocol network.

3. The method of claim 1, wherein the call setup signaling message is received by the processor of a call control element of the packet network.

4. The method of claim 1, wherein the call setup signaling message is for a long distance phone call.

5. The method of claim 1, wherein the outgoing access link type is determined from an application server.

6. The method of claim 1, wherein the outgoing access link is connected to a border element of the packet network.

7. The method of claim 1, further comprising:

completing a call setup procedure using the outgoing access link.

8. A non-transitory computer-readable storing a plurality of instructions which, when executed by a processor, cause the processor to perform operations for terminating a call in a packet network, the operations comprising:

receiving a call setup signaling message to setup a call from a wholesale customer at the packet network;

determining an outgoing access link type for the call based upon a calling party number, wherein the outgoing access link type comprises a primary rate interface access link to a competitive local exchange carrier or a regulated access link to a local exchange carrier; and selecting an outgoing access link in accordance with the outgoing access link type to complete the call.

9. The non-transitory computer-readable medium of claim 8, wherein the packet network is an Internet protocol network.

10. The non-transitory computer-readable medium of claim 8, wherein the call setup signaling message is received by a call control element of the packet network.

11. The non-transitory computer-readable medium of claim 8, wherein the call setup signaling message is for a long distance phone call.

12. The non-transitory computer-readable medium of claim 8, wherein the outgoing access link type is determined from an application server.

13. The non-transitory computer-readable medium of claim 8, wherein the outgoing access link is connected to a border element of the packet network.

14. The non-transitory computer-readable medium of claim 8, further comprising:

completing a call setup procedure using the outgoing access link.

15. An apparatus for terminating a call in a packet network, comprising:

a processor; and a computer-readable medium storing a plurality of instructions which, when executed by the processor, cause the processor to perform operations, the operations comprising:

receiving a call setup signaling message to setup a call from a wholesale customer at the packet network;

determining an outgoing access link type for the call based upon a calling party number, wherein the outgoing access link type comprises a primary rate interface access link to a competitive local exchange carrier or a regulated access link to a local exchange carrier; and selecting an outgoing access link in accordance with the outgoing access link type to complete the call.

16. The apparatus of claim 15, wherein the packet network is an internet protocol network.

17. The apparatus of claim 15, wherein the call setup signaling message is for a long distance phone call.

* * * * *